(12) United States Patent
Uchida

(10) Patent No.: US 10,239,268 B2
(45) Date of Patent: Mar. 26, 2019

(54) TIRE MOLD AND PNEUMATIC TIRE

(71) Applicant: BRIDGESTONE CORPORATION, Chuo-ku, Tokyo (JP)

(72) Inventor: Takahiro Uchida, Higashimurayama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 1140 days.

(21) Appl. No.: 14/377,674

(22) PCT Filed: Feb. 12, 2013

(86) PCT No.: PCT/JP2013/000744
§ 371 (c)(1),
(2) Date: Aug. 8, 2014

(87) PCT Pub. No.: WO2013/118518
PCT Pub. Date: Aug. 15, 2013

(65) Prior Publication Data
US 2015/0027609 A1   Jan. 29, 2015

(30) Foreign Application Priority Data
Feb. 9, 2012   (JP) .................................. 2012-026672

(51) Int. Cl.
*B60C 15/024* (2006.01)
*B60C 15/06* (2006.01)
(Continued)

(52) U.S. Cl.
CPC .......... *B29D 30/0606* (2013.01); *B60C 13/02* (2013.01); *B60C 15/024* (2013.01);
(Continued)

(58) Field of Classification Search
CPC ................ B60C 13/02; B60C 15/0242; B60C 15/0603; B60C 2015/061; B60C 15/024; B60C 15/06
(Continued)

(56) References Cited

U.S. PATENT DOCUMENTS 3,467,989 A   9/1969   Youngblood et al.
2009/0183811 A1   7/2009   Hiroishi

FOREIGN PATENT DOCUMENTS

CN   101454136 A   6/2009
JP   62-299411 A   12/1987
(Continued)

OTHER PUBLICATIONS

Machine Translation: JP 2007045361 A; Ota, Hiromi; no date.*
(Continued)

*Primary Examiner* — Kendra Ly
(74) *Attorney, Agent, or Firm* — Sughrue Mion, PLLC

(57) ABSTRACT

Provided are: a tire mold including a bead portion molding surface for molding the bead portion of the tire, the bead portion molding surface having a ridge molding part including a recessed groove extending in the mold radial direction, the ridge molding part being formed in a flange contact portion molding region for molding a rim-flange contact portion of the tire; and a pneumatic tire, in which a bead filler has the tire radial direction outer end positioned more inward in the tire radial direction relative to the rim line position, and a ridge forming portion including a ridge extending in the tire radial direction is formed on the outer surface of the bead portion, the ridge forming portion being positioned in the rim flange contact portion.

13 Claims, 5 Drawing Sheets

(51) Int. Cl.
  *B29D 30/06* (2006.01)
  *B60C 13/02* (2006.01)
(52) U.S. Cl.
  CPC ............... *B29D 2030/0612* (2013.01); *B29D 2030/0616* (2013.01); *B29D 2030/0617* (2013.01); *B60C 15/0603* (2013.01); *B60C 2015/0614* (2013.01); *Y10T 152/10819* (2015.01)
(58) Field of Classification Search
  USPC .......................................... 152/523, 539–547
  See application file for complete search history.

(56) References Cited

FOREIGN PATENT DOCUMENTS

| | | | | | |
|---|---|---|---|---|---|
| JP | 10071814 | A | * | 3/1998 | |
| JP | 11-139116 | A | | 5/1999 | |
| JP | 11301218 | A | * | 11/1999 | ......... B60C 15/0607 |
| JP | 2007-45361 | A | | 2/2007 | |
| JP | 2007045361 | A | * | 2/2007 | |
| JP | 2007-62484 | A | | 3/2007 | |
| JP | 2007062484 | A | * | 3/2007 | |
| JP | 2008-273084 | A | | 11/2008 | |
| WO | 01/25030 | A1 | | 4/2001 | |
| WO | WO 0125030 | A1 | * | 4/2001 | ............. B60B 21/00 |

OTHER PUBLICATIONS

Machine Translation: JP 2007062484 A; Kamata, Nobuyuki; no date.*
Machine Translation: JP-2007062484-A; Kamata, Nobuyuki; (Year: 2018).*
Machine Translation: JP-11301218-A; Mama, Riichiro; (Year: 2018).*
Machine Translation: JP-10071814-A; Teramoto, Hideki (Year: 2018).*
Communication dated Sep. 8, 2015, issued by the European Patent Office in corresponding European Application No. 13746105.9.
International Search Report for PCT/JP2013/000744 dated Apr. 23, 2013 [PCT/ISA/210].
Communication dated Nov. 10, 2015 from the Japanese Patent Office in counterpart application No. 2012-026672.
Communication dated Oct. 26, 2015 from the State Intellectual Property Office of P.R. China issued in corresponding Chinese application No. 2013800189178.

* cited by examiner

I-I section

II-II section

TIRE MOLD AND PNEUMATIC TIRE

CROSS REFERENCE TO RELATED APPLICATIONS

This application is a National Stage of International Application No. PCT/JP2013/000744, filed on Feb. 12, 2013, which claims priority from Japanese Patent Application No. 2012-026672, filed on Feb. 9, 2012, the contents of all of which are incorporated herein by reference in their entirety.

TECHNICAL FIELD

The present invention relates to a tire mold and a pneumatic tire. In particular, the present invention relates to a tire mold suited for manufacturing a tire with a downsized bead filler, and to a pneumatic tire with a downsized bead filler.

BACKGROUND ART

In general, a tire mold is provided with an exhaust duct for discharging, to the outside of the mold, air or the like remaining between a green tire and the mold surface. Conventionally, such exhaust duct of a tire mold is formed by means of a vent piece fit into a vent hole (through hole) formed in the mold.

Here, in the case of manufacturing a tire with the use of a tire mold having an exhaust duct formed by means of a vent hole and a vent piece, the rubber is caused to squeeze out into the exhaust duct when the tire is subjected to vulcanization molding, with the result that a number of spews (cylindrical bars) are formed on the outer surface of the vulcanization-molded tire.

In recent years, however, in terms of improving fuel efficiency of vehicles, tires to be mounted on vehicles have been required to be reduced in weight. Along therewith, it has been proposed, as a method of reducing the tire weight, to downsize the bead filler to be disposed on the tire radial direction outside of the bead core embedded in the bead portion (see, for example, Patent Literature 1 (PTL 1)).

CITATION LIST

Patent Literature

PTL 1: JP 2007-45361 A

SUMMARY OF INVENTION

Technical Problem

However, along with the reduction in size of the bead filler (that is, reduction in volume of the bead filler rubber), the aforementioned conventional pneumatic tire with the downsized bead filler suffers reduction in adhesion between the bead portion of the green tire and the tire mold during vulcanization molding of the tire. As a result, in the aforementioned conventional pneumatic tire, air is accumulated between the bead portion of the green tire and the inner periphery of the tire mold when the tire is subjected to vulcanization molding, which has led to a problem that bare defects (poor appearance due to an insufficient rubber flow) tend to occur in the bead portion of the resulting manufactured tire.

Here, bare defects tend to occur particularly in the vicinity of the tire radial direction outer end portion of the bead filler where a level difference is likely to be generated in the green tire due to manufacturing reasons.

Here, as one of the means conceivable to prevent the occurrence of bare defects in the bead portion during the manufacture of a pneumatic tire with a downsized bead filler, there may be formed a number of exhaust ducts communicating between the inside and the outside of the mold in a mold part (bead portion molding surface) for molding the bead portion of the tire, so as to accelerate the discharge of air to the outside of the mold.

However, the large number of exhaust ducts thus formed in the bead portion molding surface of the tire mold leads to the formation of a number of spews in the outer surface of the bead portion of the tire manufactured by the tire mold, which may degrade the adhesion between the resulting manufactured tire and the rim to cause air leakage. In particular, the use of a tire mold having an exhaust duct formed in a bead portion molding surface which corresponds to a portion susceptible to the occurrence of bare defects, (for example, in the vicinity of the tire radial direction outer end portion of the bead filler) in the manufacture of a tire with a downsized bead filler may result in the formation of spews in the tire outer surface portion to be brought into contact with a rim, which degrade the adhesion between the resulting manufactured tire and the rim to cause air leakage.

Accordingly, in the case of manufacturing a pneumatic tire with a downsized bead filler, it is hard to adopt the aforementioned method of forming an exhaust duct in the bead portion molding surface to prevent the occurrence of bare defects.

Under the aforementioned circumstances, the present invention has been made, and therefore, it is an object of the invention to provide a tire mold capable of suppressing the occurrence of bare defects in the bead portion even in the case of manufacturing a pneumatic tire with a downsized bead filler, and also of manufacturing a pneumatic tire having excellent adhesion to the rim.

Further, another object of the present invention is to provide a pneumatic tire with a downsized bead filler, the pneumatic tire having fewer occurrences of bare defects in the bead portion and excellent adhesion to the rim.

Solution to Problem

The present invention has an object of advantageously solving the aforementioned problems, and thus, a tire mold according to the present invention includes a bead portion molding surface for molding a bead portion of a tire, in which: the bead portion molding surface has a ridge molding part including a recessed groove extending in the mold radial direction; and the ridge molding part is formed in a flange contact portion molding region on the bead portion molding surface, the flange contact portion molding region being configured to mold a rim-flange contact portion lying between a bead heel and a rim line position of the tire. With the ridge molding part being formed in the flange contact portion molding region on the bead portion molding surface as described above, air in the mold can be caused to flow outside in the mold radial direction via the recessed grooves of the ridge molding part when subjecting the green tire to vulcanization molding, to thereby suppress air accumulation, which may otherwise occur between the bead portion of the green tire and the bead portion molding surface. Therefore, according to the tire mold thus configured, the occurrence of bare defects in the bead portion of a vulcanization-molded tire can be suppressed without the need of forming, in the bead portion molding surface, in particular, in the flange contact portion molding region of the bead portion molding surface, any exhaust duct such as a vent hole which may otherwise lead to the formation of spews. Accordingly, the tire mold is capable manufacturing a pneumatic tire having excellent adhesion to the rim while suppressing the occurrence of bare defects in the bead portion, even if the pneumatic tire has a downsized bead filler.

Here, in the present invention, "to extend in the mold radial direction" refers to extending toward the mold radial direction, and thus, "to extend in the mold radial direction" even refers to extending as being tilted at a predetermined angle $\theta$ (provided that $0°<\theta<90°$) relative to a direction parallel to the mold radial direction. Further, in the present invention, the "rim line position" refers to an intersection between a virtual line and a tire outer surface in a tire that has been assembled to an applicable rim and filled with a predetermined internal pressure with no load applied thereon, the virtual line extending in parallel to the tire width direction as passing though a position outside in the tire radial direction at a distance of 20.0 mm from the bead heel. However, in the case where the intersection between the virtual line and the tire outer surface is positioned inward in the tire radial direction relative to the tire width direction line passing through a separating point between the tire and the rim, the "rim line position" refers to a position passed by the tire width direction line passing through the separation point between the tire and the rim.

Incidentally, the "applicable rim" refers to a rim specified in industrial standards effective in regions where the tire is produced or used, such as JATMA (The Japan Automobile Tyre Manufacturers Association, Inc) YEAR BOOK in Japan, ETRTO (European Tyre and Rim Technical Organisation) STANDARD MANUAL in Europe, and TRA (THE TIRE and RIM ASSOCIATION INC.) YEAR BOOK in the United States. Further, a tire which is "assembled to an applicable rim and filled with a predetermined internal pressure with no load applied thereon" refers to a tire which is assembled to an applicable rim and filled with an internal pressure (maximum air pressure) associated with the tire maximum tire load capacity specified in JATMA or in other standards for a tire in the applicable size.

Here, in the tire mold of the present invention, the recessed groove may preferably have an extending-direction length of 2.0 mm or more and 10.0 mm or less for the following reasons. That is, with the extending-direction length of the recessed groove being 2.0 mm or more, air accumulation can fully be suppressed, which may otherwise occur between the bead portion of the green tire and the bead portion molding surface, to thereby further suppress the occurrence of bare defects in the bead portion in the vulcanization-molded tire. Meanwhile, with the extending-direction length of the recessed groove being 10.0 mm or less, degradation in adhesion between the bead portion of the vulcanization-molded tire and the rim can be suppressed.

Further, in the tire mold of the present invention, the recessed groove may preferably have a depth of 0.2 mm or more and 0.4 mm or less for the following reasons. That is, with the groove depth being 0.2 mm or more, air accumulation can fully be suppressed, which may otherwise occur between the bead portion of the green tire and the bead portion molding surface, to thereby further suppress the occurrence of bare defects in the bead portion in the vulcanization-molded tire. Meanwhile, with the groove depth being 0.4 mm or less, degradation in adhesion between the bead portion of the vulcanization-molded tire and the rim can be suppressed.

Further, in the tire mold of the present invention, the ridge molding part may preferably include a plurality of recessed grooves, and the recessed grooves may preferably have an arrangement pitch of 0.6 mm or more and 1.0 mm or less, for the following reasons. With the arrangement pitch of the recessed grooves being 0.6 mm or more, air accumulation can fully be suppressed, which may otherwise occur between the bead portion of the green tire and the bead portion molding surface, to thereby further suppress the occurrence of bare defects in the bead portion in the vulcanization-molded tire. Meanwhile, with the arrangement pitch of the recessed grooves being 1.0 mm or less, degradation in adhesion between the bead portion of the vulcanization-molded tire and the rim can be suppressed.

Here, in the present invention, the "arrangement pitch of the recessed grooves" refers to a distance between recessed grooves adjacent to each other in section passing the center of the ridge molding portion in the extending direction of the recessed grooves.

Then, in the tire mold of the present invention, the ridge molding part may preferably be in a knurled shape for the following reasons. That is, the knurled shape is configured to be suited for suppressing both the occurrence of bare defects in the bead portion in the vulcanization-molded tire and degradation in adhesion between the bead portion of the vulcanization-molded tire and the rim.

Here, in the present invention, when the "ridge molding portion is in a knurled shape", the ridge molding portion renders a zigzag pattern when viewed in section in a direction orthogonal to the extending direction of the recessed grooves in the ridge molding portion.

Further, the present invention has an object of advantageously solving the aforementioned problems, and thus, a pneumatic tire according to the present invention includes: a bead core embedded in a bead portion; and a bead filler disposed on the tire radial direction outside of the bead core, in which: the bead filler has a tire radial direction outer end positioned more inward in the tire radial direction relative to the tire width direction line that passes through the rim line position to extend along the tire width direction, when viewed in section in the tire width direction of the tire which has been assembled to an applicable rim and filled with a predetermined internal pressure with no load applied thereon; the bead portion has a ridge forming portion formed on an outer surface thereof, the ridge forming portion including a ridge extending in the tire radial direction; the ridge forming portion is positioned in a rim-flange contact portion lying between a bead heel and the rim line position. With the ridge forming portion including ridges being formed in the rim-flange contact portion as described above, the tire mold for use in manufacturing the pneumatic tire may be configured to have, in the flange contact portion molding region, the ridge molding part including recessed grooves as described above. Therefore, even if the bead filler has a tire radial direction outer end which is positioned more inward in the tire radial direction relative to the tire width direction line passing through the rim line position, there can be provided a pneumatic tire which has fewer occurrences of bare defects in the bead portion and excellent adhesion to the rim.

Here, in the present invention, "to extend in the tire radial direction" refers to extending toward the tire radial direction, and thus, "to extend in the tire radial direction" even refers to extending as being tilted at a predetermined angle $\theta$ (provided that $0°<\theta<90°$) relative to a direction parallel to the tire radial direction. Further, in the present invention, "extending along the tire width direction" refers to extending in a direction parallel to the tire width direction. In this regard, the terms such as the "applicable rim", "assembled to an applicable rim and filled with a predetermined internal pressure with no load applied thereon", and the "rim line position" each may be construed as described above.

Here, in the pneumatic tire of the present invention, the ridge may preferably have an extending-direction length of 2.0 mm or more and 10.0 mm or less for the following reasons. That is, with the extending-direction length of the ridge being 2.0 mm or more, the recessed groove in a tire mold for use in manufacturing a pneumatic tire may have a length of 2.0 mm or less in the extending direction, to thereby further suppress the occurrence of bare defects in the bead portion in the tire. Meanwhile, with the extending-direction length of the ridge being 10.0 mm or less, the recessed groove in a tire mold for use in manufacturing a pneumatic tire may have a length of 10.0 mm or less in the extending direction, which can suppress degradation in adhesion between the bead portion of the tire and the rim.

Further, in the pneumatic tire of the present invention, the ridge may preferably have a height of 0.2 mm or more and 0.4 mm or less, for the following reasons. That is, with the height of the ridge being 0.2 mm or more, the recessed groove in a tire mold for use in manufacturing a pneumatic tire may have a depth of 0.2 mm or more, to thereby further suppress the occurrence of bare defects in the bead portion in the tire. Meanwhile, with the height of the ridge being 0.4 mm or more, the recessed groove in a tire mold for use in manufacturing a pneumatic tire may have a depth of 0.4 mm or less, which can suppress degradation in adhesion between the bead portion of the tire and the rim.

Further, in the pneumatic tire of the present invention, the ridge forming portion may preferably include a plurality of ridges; and the ridges may preferably have an arrangement pitch of 0.6 mm or more and 1.0 mm for the following reasons. That is, with the arrangement pitch of the ridges being 0.6 mm or more, the recessed grooves in a tire mold for use in manufacturing a pneumatic tire may be arranged at a pitch of 0.6 mm or more, to thereby further suppress the occurrence of bare defects in the bead portion in the tire. Meanwhile, with the arrangement pitch of the ridges being 1.0 mm or less, the recessed grooves in a tire mold for use in manufacturing a pneumatic tire may be arranged at a pitch of 1.0 mm or less, which can suppress degradation in adhesion between the bead portion of the tire and the rim.

Here, in the present invention, the "arrangement pitch of the ridges" refers to a distance between ridges adjacent to each other in section passing the center of the ridge forming portion in the extending direction of the ridges.

Then, in the pneumatic tire of the present invention, the ridge forming portion may preferably in a knurled shape for the following reason. That is, the knurled shape is configured to be suited for suppressing both the occurrence of bare defects in the bead portion in the tire and degradation in adhesion between the bead portion of the tire and the rim.

Here, in the present invention, when "the ridge forming portion is in a knurled shape", the ridge forming portion renders a zigzag pattern when viewed in section in a direction orthogonal to the extending direction of the ridges in the ridge forming portion.

Further, in the pneumatic tire of the present invention, the ridge forming portion may preferably be positioned, in part in the extending direction thereof, on the tire width direction outside of the tire radial direction outer end of the bead filler, for the following reasons. That is, with the ridge forming portion being formed on the tire width direction outside of the tire radial direction outer end of the bead filler, a pneumatic tire can be manufactured by using a tire mold having the ridge molding part in a portion which is particularly susceptible to degradation in adhesion to the green tire and easy to collect air. Further, from the same point of view, the ridge forming portion in the pneumatic tire of the present invention may preferably extend to an intersection between the tire outer surface and a normal line passing through the tire radial direction outer end of the bead filler to intersect at a right angle with the tire outer surface.

Advantageous Effect of Invention

According to the present invention, there can be provided a tire mold capable of suppressing the occurrence of bare defects in the bead portion even in manufacturing a pneumatic tire with a downsized bead filler, and also of manufacturing a pneumatic tire having excellent adhesion to the rim. Further, according to the present invention, there can be provided a pneumatic tire with a downsized bead filler, the pneumatic tire having fewer occurrences of bare defects in the bead portion and excellent adhesion to the rim.

BRIEF DESCRIPTION OF DRAWINGS

The present invention will further be described below with reference to the accompanying drawings, wherein.

DESCRIPTION OF EMBODIMENTS

In the following, embodiments of the present invention will be described in detail with reference to the accompanying drawings. Here, a tire mold of the present invention has a feature in that a ridge molding part including a recessed groove extending in the mold radial direction is formed in a flange contact portion molding region for molding a rim-flange contact portion (portion lying between the bead heel and the rim line position) of a tire. Further, a pneumatic tire of the present invention relates to a tire having a downsized bead filler, which has a feature in that the rim-flange contact portion has, inside thereof, a ridge forming portion including a ridge extending in the tire radial direction.

[Tire Mold]

One example of the tire mold of the present invention includes an annular mold for use in vulcanization molding of a tire. Then, to subject a tire to vulcanization molding using this exemplary tire mold, an unvulcanized green tire (raw tire) is loaded into the mold and a high-temperature high-pressure fluid is supplied inside of a bladder disposed on the inner peripheral side of the green tire so as to inflate the bladder, so that the inner periphery of the green tire is pressed by the outer periphery of the bladder, to thereby bring the green tire into pressure-contact with the inner periphery of the mold.

Here, this exemplary tire mold has a tread portion molding surface for molding a tread portion of the tire, a sidewall portion molding surface for molding a sidewall portion of the tire, and a bead portion molding surface for molding a bead portion of the tire.

Specifically, the exemplary tire mold includes: a tread molding part having a tread portion molding surface; a pair of side molding parts each having a sidewall portion molding surface; and a pair of bead molding parts each having a bead portion molding surface. Further, the inner periphery of the tire mold has: a tread portion molding surface; a pair of sidewall portion molding surfaces inwardly extending in the mold radial direction from a side of the tread portion molding surface; and a bead portion molding surface connecting inwardly in the mold radial direction to each of the sidewall portion molding surfaces.

Then, the tread molding part and the side molding part of this exemplary tire mold are each similarly configured as a tread molding part and a side molding part of a conventional tire mold, respectively. Here, at least one of the tread molding part and the side molding part of this exemplary tire mold has an exhaust duct formed therein for discharging, to the outside of the mold, air or the like remaining between the green tire and the mold surface as a result of vulcanization molding of the tire. Here, the exhaust duct is not particularly limited, and may be formed by means of a vent piece fit into a vent hole (through hole) communicating between the inside and the outside of the mold.

Figure 1:
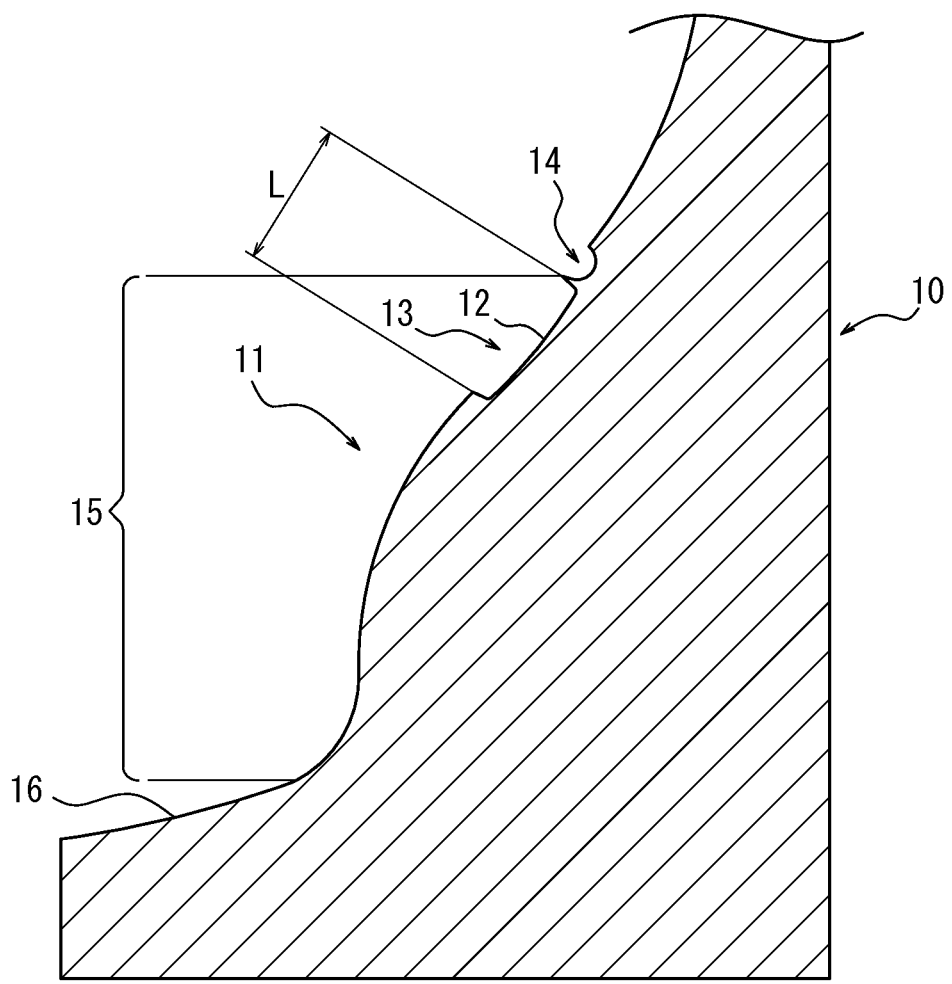
FIG. 1 is an enlarged sectional view in the mold width direction, illustrating the vicinity of the bead molding part of a representative tire mold according to the present invention.

As illustrated in FIG. 1 showing a sectional view of the vicinity of a bead molding part 10 in the mold width direction, the bead molding part of the exemplary tire mold has, inside in the mold width direction (on the left of FIG. 1), a bead portion molding surface 11 for molding a bead portion of the tire. Then, formed in the bead portion molding surface 11 of the bead molding part 10 is a ridge molding part 13 including a plurality of recessed grooves 12 extending parallel in the mold radial direction (in the vertical direction of FIG. 1). Further, formed in the bead portion molding surface 11 is a recessed part 14 for molding a protruding rim line at a rim line position of the tire.

It should be noted that, the bead molding part 10 of the exemplary tire mold has no exhaust duct formed therein which otherwise causes formation of spews during vulcanization molding of the tire.

Here, the ridge molding part 13 is formed within a flange contact portion molding region 15 on the bead portion molding surface 11. Specifically, as illustrated in FIG. 1, the outer edge in the mold radial direction of the ridge molding portion 13 lies at the same position as the outer edge in the mold radial direction of the flange contact portion molding region 15, that is, at the same position as the inner edge in the mold radial direction of the recessed part 14. Further, the inner edge in the mold radial direction of the ridge molding part 13 is found at a distance L from the outer edge in the mold radial direction of the ridge molding part 13 while lying more outward in the mold radial direction relative to the inner edge in the mold radial direction of the flange contact portion molding region 15.

Here, the flange contact portion molding region 15 is a part for molding a rim-flange contact portion (portion lying between the bead heel and the rim line position) of the tire. That is, as illustrated in FIG. 1, the flange contact portion molding region 15 is a part extending outward in the mold radial direction (in the upper right direction of FIG. 1), between the recessed part 14 for molding a rim line in the tire and the outer edge in the mold width direction of a bead base molding region 16 extending in the mold width direction for molding a bead base (portion extending between the bead toe and the bead heel) of the tire.

Figure 2A:
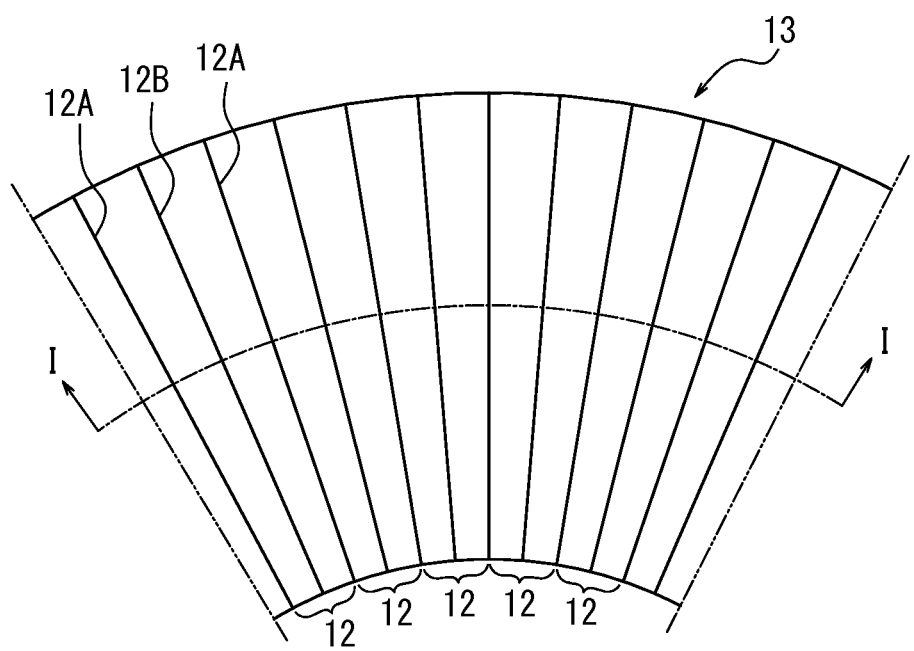
FIG. 2A is a view illustrating in part a ridge molding part of the tire mold of FIG. 1.
Figure 2B:
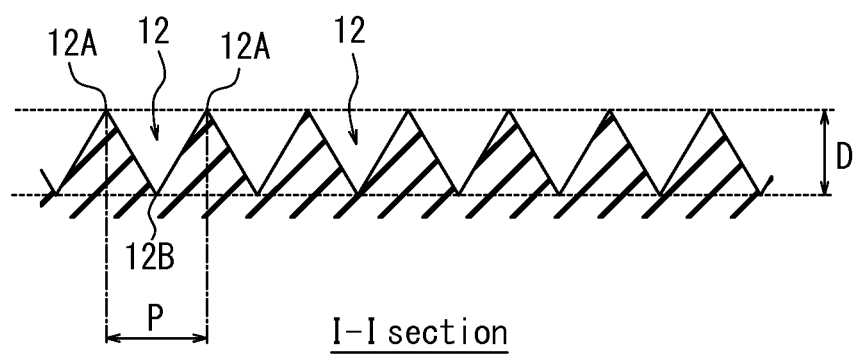
FIG. 2B is a sectional view taken along the line I-I of FIG. 2A.

Further, with reference to FIG. 2A illustrating in part a shape of the ridge molding part 13 viewed from the inner periphery of the mold and to FIG. 2B illustrating a section taken along the line I-I of FIG. 2A (section in a direction perpendicular to the extending direction of the recessed grooves 12), the ridge molding portion 13 is formed of the plurality of recessed grooves 12 closely disposed throughout the entire circumference of the bead portion molding surface 11 of the annular tire mold. More specifically, as illustrated in FIGS. 2A and 2B, the ridge molding part 13 is formed of the closely-disposed recessed grooves 12 each being triangular in shape in section taken along the line I-I, so that the ridge molding part 13 assumes a knurled shape that renders a zigzag pattern in section taken along the line I-I (triangular waves having apex points 12A, 12B in FIG. 2B).

Here, the ridge molding part 13 in a knurled shape is not particularly limited, and may be formed by subjecting the bead portion molding surface 11 to knurling by a known method. Further, in the tire mold of the present invention, the shape of the ridge molding part is not limited to the knurled shape, and the ridge molding part may be formed in any shape using recessed grooves extending in the mold radial direction.

Here, the plurality of recessed grooves 12 forming the ridge molding part 13 each have a length L in the extending direction, a depth D, and an arrangement pitch P.

Then, according to the aforementioned exemplary tire mold, which has the ridge molding part 13 within the flange contact portion molding region 15 on the bead portion molding surface 11, air in the mold can be caused to flow outside in the mold radial direction via the recessed grooves 12 of the ridge molding part 13 when a green tire is loaded inside the mold to subject the tire to vulcanization molding, so as to discharge the air from the exhaust duct (not shown) formed more outside in the mold radial direction relative to the recessed part 14. In other words, in the aforementioned exemplary tire mold, the recessed grooves 12 of the ridge molding part 13 can be used as a flow channel of air remaining in the mold during vulcanization molding. Therefore, even in the case of subjecting a pneumatic tire having a downsized bead filler to vulcanization molding, the tire being susceptible to degradation in adhesion between the bead portion of the green tire and the tire mold, air accumulation can be suppressed which may otherwise occur between the bead portion of the green tire and the bead portion molding surface. As a result, according to the exemplary tire mold, degradation in adhesion between the bead portion of the green tire and the tire mold can be suppressed which may otherwise occur when the tire is subjected to vulcanization molding, to thereby suppress the occurrence of bare defects in the bead portion during the tire manufacturing process.

Further, the exemplary tire mold is capable of allowing air inside the mold to flow outside in the mold radial direction via the recessed grooves 12 so that the air can be discharged from an exhaust duct formed more outside in the mold radial direction relative to the recessed part 14, to thereby suppress air accumulation in the mold without the need of forming, in the bead portion molding surface 11, in particular, within the flange contact portion molding region 15 on the bead portion molding surface 11, any exhaust duct such as a vent hole which may otherwise result in formation of spews. Therefore, according to the exemplary tire mold, the adhesion between the bead portion of the green tire and the tire mold can be improved to suppress the occurrence of bare defects in the bead portion while avoiding the formation of spews in the bead portion, to thereby manufacture a pneumatic tire having excellent adhesion to the rim.

Further, according to the exemplary tire mold, in which the ridge molding part 13 formed of the recessed grooves 12 is disposed within the flange contact portion molding region 15 on the bead portion molding surface 11, the recessed grooves 12 accelerate the discharge of air from a part easy to collect air during vulcanization molding while eliminating the need of forming a recessed groove in a part relatively unlikely to collect air during vulcanization molding (i.e., the bead base molding region 16). Therefore, the ridges to be molded by the ridge molding part 13 can be confined to a minimum range on the tire outer surface, with the result that degradation in adhesion between the tire and the rim resulting from the formation of ridges can be suppressed.

Therefore, the exemplary tire mold is capable of suppressing the occurrence of bare defects in the bead portion even in the case of manufacturing a pneumatic tire with a downsized bead filler, and also capable of manufacturing a pneumatic tire having excellent adhesion to the rim.

Here, the exemplary tire mold, which has the ridge molding part 13 formed in a knurled shape, is capable of favorably suppressing both the occurrence of bare defects in the bead portion in the resulting vulcanization-molded tire and degradation in adhesion between the bead portion of the resulting vulcanization-molded tire and the rim.

Here, in the aforementioned exemplary tire mold, the recessed grooves 12 each may preferably have the extending-direction length L of 2.0 mm to 10.0 mm due to the following reasons. That is, with the extending-direction length L of the recessed grooves 12 being 2.0 mm or more, air accumulation can fully be suppressed, which may otherwise occur between the bead portion of the green tire and the bead portion molding surface 11, to thereby further suppress the occurrence of bare defects in the bead portion in the vulcanization-molded tire. Meanwhile, with the extending-direction length L of the recessed grooves 12 being 10.0 mm or less, the length of the ridges to be formed in the vulcanization-molded tire can also be defined to be 10.0 mm or less so that degradation in adhesion between the bead portion of the tire and the rim can be suppressed. It is further preferred that the extending-direction length L is 4.0 mm or less.

Further, the recessed grooves 12 each may preferably have the depth D of 0.2 mm to 0.4 mm for the following reasons. That is, with the depth D of the recessed grooves 12 being 0.2 mm or more, air accumulation can fully be suppressed, which may otherwise occur between the bead portion of the green tire and the bead portion molding surface 11, to thereby further suppress the occurrence of bare defects in the bead portion in the vulcanization-molded tire. Meanwhile, with the depth D of the recessed grooves 12 being 0.4 mm or less, the height of the ridges to be formed in the vulcanization-molded tire can also be defined to be 0.4 mm or less so that degradation in adhesion between the bead portion of the tire and the rim can be suppressed.

Further, the recessed grooves 12 may preferably have the arrangement pitch P of the recessed grooves 12 in the ridge molding portion 13 may preferably be 0.6 mm to 1.0 mm for the following reasons. That is, with the arrangement pitch P of the recessed grooves 12 being 0.6 mm or more, air accumulation can fully be suppressed, which may otherwise occur between the bead portion of the green tire and the bead portion molding surface 11, to thereby further suppress the occurrence of bare defects in the bead portion in the vulcanization-molded tire. Meanwhile, with the arrangement pitch P of the recessed grooves 12 being 1.0 mm or less, the ridges to be formed in the vulcanization-molded tire are also to be arranged at a pitch of 1.0 mm or less so that degradation in adhesion between the bead portion of the tire and the rim can be suppressed.

Further, the ridge molding part 13 may preferably be formed in a range of 10.0 mm or less, and more preferably in a range of 4.0 mm or less in distance toward inside in the mold radial direction along the inner periphery of the mold from a position (recessed part 14) corresponding to the rim line position of the tire to be molded, in order for suppressing degradation in adhesion between the bead portion of the vulcanization-molded tire and the rim.

[Pneumatic Tire]

An example of a pneumatic tire of the present invention includes: a tread portion; a pair of sidewall portions extending inward in the tire radial direction from the side of the tread portion; and a bead portion connecting inwardly in the mold radial direction to each of the sidewall portions.

Further, the exemplary pneumatic tire includes a radial carcass including one ply extending between the pair of bead portions.

Figure 3:
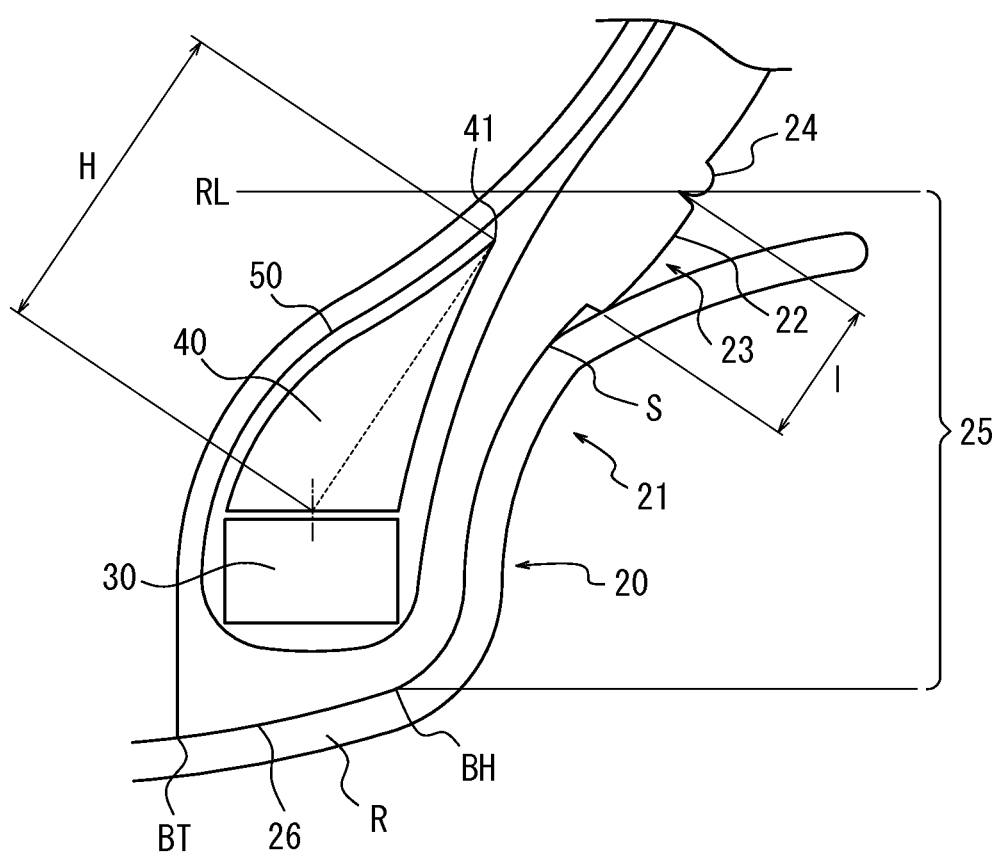
FIG. 3 is an enlarged sectional view in the tire width direction, illustrating the vicinity of the bead portion of a representative pneumatic tire according to the present invention.

Here, in the exemplary pneumatic tire, which is illustrated in FIG. 3 in section in the tire width direction in the vicinity of the bead portion 20, the radial carcass 50 toroidally extends from the tread portion (not shown) through the pair of sidewalls (not shown) across the pair of bead portions 20 (only one of which is shown), and is folded back from the inside in the tire width direction to the outside in the tire width direction, around a bead core 30 which is substantially rectangular in section and embedded in the bead portion 20.

Here, FIG. 3 is a sectional view in the tire width direction in the vicinity of the bead portion of a tire assembled to an applicable rim R and filled with a predetermined internal pressure, with no load applied thereon.

Here, the tread portion and the sidewall portions of the exemplary pneumatic tire are each similarly configured as those of a conventional pneumatic tire.

Further, as illustrated in FIG. 3, the exemplary pneumatic tire includes a small-sized bead filler 40 on the tire radial direction outside of the bead core 30. The bead filler 40 is substantially triangular in shape in section in the tire width direction, and gradually reduced in thickness outward in the tire radial direction along the radial carcass 50. Then, the bead filler 40 has an outer end 41 in the tire radial direction, which is positioned more inward in the tire radial direction relative to the tire width direction line RL that passes through the rim line position of the tire to extend along the tire width direction.

Here, the bead filler 40 has an extending direction dimension H, which is not particularly limited, and may be defined, for example, to be 5.0 mm to 20.0 mm. Here, the "extending direction dimension H of the bead filler" refers to a minimum distance between the tire width direction center of the tire radial direction inner edge of the bead filler and the tire radial direction outer edge of the bead filler.

Then, as illustrated in FIG. 3, the bead portion 20 of the exemplary pneumatic tire has an outer surface 21, where there is formed a ridge forming portion 23 including a plurality of ridges 22 extending parallel in the tire radial direction (vertical direction of FIG. 3). Further, a rim line formed of a projected portion 24 is formed on the outer surface 21 of the bead portion 20.

It should be noted that, in the exemplary pneumatic tire, the rim line position coincides with the position where the tire width direction inner end of the projected portion 24 is passing through.

Here, the ridge forming portion 23 is formed inside the rim flange contact portion 25 on the outer surface 21 of the bead portion 20. Specifically, as illustrated in FIG. 3, the ridge forming portion 23 has a tire radial direction outer edge which lies at the same position as the tire radial direction outer edge of the rim flange contact portion 25, that is, the tire width direction inner edge of the projected portion 24. Further, the ridge forming portion 23 has a tire radial direction inner edge which is found at a distance l from the tire radial direction outer edge of the ridge forming portion 23 while being located more outside in the tire radial direction relative to the tire radial direction inner edge of the rim flange contact portion 25, that is, to the bead heel BH.

As illustrated in FIG. 3, the rim flange contact portion 25 is a portion extending in the tire radial direction (in the upper right direction of FIG. 3), between the projected portion 24 forming a rim line in the tire and the bead heel BH which is the tire width direction outer end of the bead base 26 (portion extending between the bead toe BT and the bead heel BH).

Figure 4A:
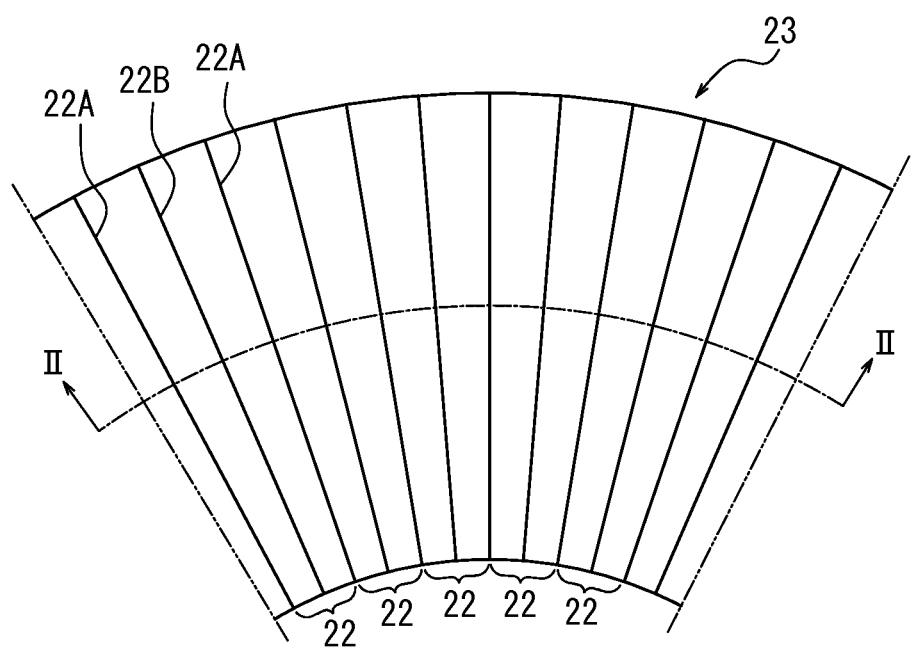
FIG. 4A is a view illustrating in part a ridge forming portion of the pneumatic tire of FIG. 3.
Figure 4B:
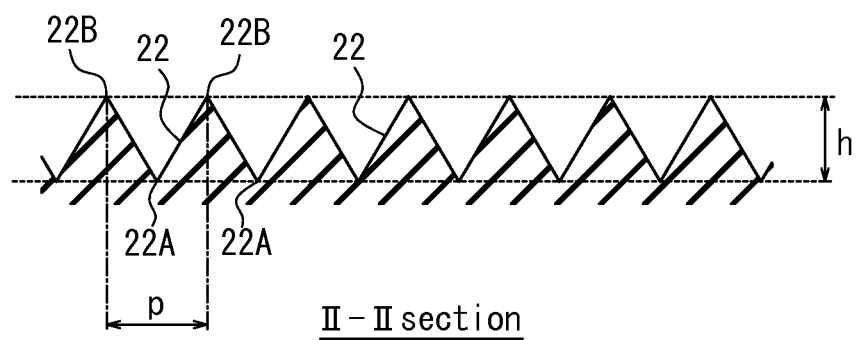
FIG. 4B is a sectional view taken along the line II-II of FIG. 4A.

Further, with reference to FIG. 4A illustrating in part a shape of the ridge forming portion 23 viewed from the tire side surface side and to FIG. 4B illustrating a section taken along the line II-II of FIG. 4A (section in a direction perpendicular to the extending direction of the ridges 22), the ridge forming portion 23 is formed of a plurality of ridges 22 closely disposed throughout the entire circumference of the outer surface 21 of the bead portion 20 of the tire. More specifically, as illustrated in FIGS. 4A and 4B, the ridge forming portion 23 is formed of the closely-disposed recessed ridges 22 each being triangular in shape in section taken along the line II-II, so that the ridge forming portion 23 assumes a knurled shape that renders a zigzag pattern in section taken along the line II-II (triangular waves having apex points 22A, 22B in FIG. 4B).

Here, the ridge forming portion 23 in a knurled shape is not particularly limited, and may be formed with respect to the outer surface 21 of the bead portion 20 by using a tire mold having the aforementioned ridge molding part. Further, in the pneumatic tire of the present invention, the shape of the ridge forming portion is not limited to the knurled shape, and the ridge forming portion may be formed in any shape using ridges extending in the tire radial direction.

Here, the plurality of ridges 22 forming the ridge forming portion 23 each have a length l in the extending direction, a height h, and an arrangement pitch p.

Then, according to an example of the pneumatic tire of the present invention, in which the ridge forming portion 23 including the ridges 22 is formed within the flange contact portion 25, the tire mold for use in manufacturing the pneumatic tire can be configured as described above to have, within the flange contact portion molding region 15, the ridge molding part 13 including ridges 12.

Therefore, the aforementioned exemplary pneumatic tire, which can be manufactured by using the tire mold with the aforementioned configuration, is capable of suppressing the occurrence of bare defects in the bead portion 20 while ensuring excellent adhesion to the rim, even if the bead filler 40 has the tire radial direction outer end 41 thereof positioned more inward in the tire radial direction relative to the tire width direction line RL passing through the rim line position.

Here, in the aforementioned exemplary pneumatic tire, the ridge forming portion 23 may preferably be disposed on the tire width direction outside of the tire radial direction outer end 41 of the bead filler 40 (the ridge forming portion 23 is positioned, in part thereof in the extending direction, on the tire width direction outside of the tire radial direction outer end 41 of the bead filler 40). Further, in the aforementioned exemplary pneumatic tire, it is further preferred that the ridge forming portion 23 extends to an intersection between the tire outer surface and a normal line passing through the tire radial direction outer end 41 of the bead filler 40 to intersect at a right angle with the tire outer surface. The reason is that a green tire can easily generate a level difference in the tire width direction outside portion of the bead filler, which is likely to deteriorate, in particular, adhesion between the green tire and the tire mold. In other words, the ridge forming portion 23 may be formed on the tire width direction outside of the tire radial direction outer end 41 of the bead filler 40 so that a pneumatic tire can be manufactured by using a tire mold having the ridge molding part in a portion which is particularly susceptible to degradation in adhesion to the green tire and easy to collect air.

Further, the ridges 22 each may preferably have the extending-direction length l of 2.0 mm or more and 10.0 mm or less for the following reasons. That is, with the extending-direction length l of the ridges 22 being 2.0 mm or more, the extending-direction length L of the recessed grooves 12 of the tire mold for use in manufacturing the pneumatic tire can be defined to be 2.0 mm or more, to thereby further suppress the occurrence of bare defects in the bead portion 20 of the tire. Meanwhile, the extending-direction l of the ridges 22 may be defined to be 10.0 mm or less so as to suppress degradation in adhesion between the bead portion 20 of the tire and the rim. The extending-direction length l may further preferably be 4.0 mm or less.

Further, the ridges 22 each may preferably have the depth h of 0.2 mm to 0.4 mm. That is, with the height h of the ridges 22 being 0.2 mm or more, the depth D of the recessed grooves 12 of the tire mold for use in manufacturing the pneumatic tire can be defined to be 0.2 mm or more, to thereby further suppress the occurrence of bare defects in the bead portion 20 of the tire. Meanwhile, the height h of the ridges 22 may be defined to be 0.4 mm or less, so as to suppress degradation in adhesion between the bead portion 20 of the tire and the rim.

The arrangement pitch p of the ridges 22 may preferably be 0.6 mm or more to 1.0 mm or less for the following reasons. That is, with the arrangement pitch p of the ridges 22 being 0.6 mm or more, the arrangement pitch P of the recessed grooves 12 of the tire mold for use in manufacturing the pneumatic tire may be defined to be 0.6 mm or more, to thereby further suppress the occurrence of bare defects in the bead portion 20 of the tire. Meanwhile, the arrangement pitch p of the ridges 22 may be defined to be 1.0 mm or less, so as to suppress degradation in adhesion between the bead portion 20 of the tire and the rim.

Here, the ridge forming portion 23 may preferably be formed in a range of 10.0 mm or less in distance along the tire outer periphery from the rim line position to the inside in the tire radial direction, and may further preferably be formed in a range of 4.0 mm or less, in order for suppressing degradation in adhesion between the bead portion of the tire and the rim.

Figure 5A:
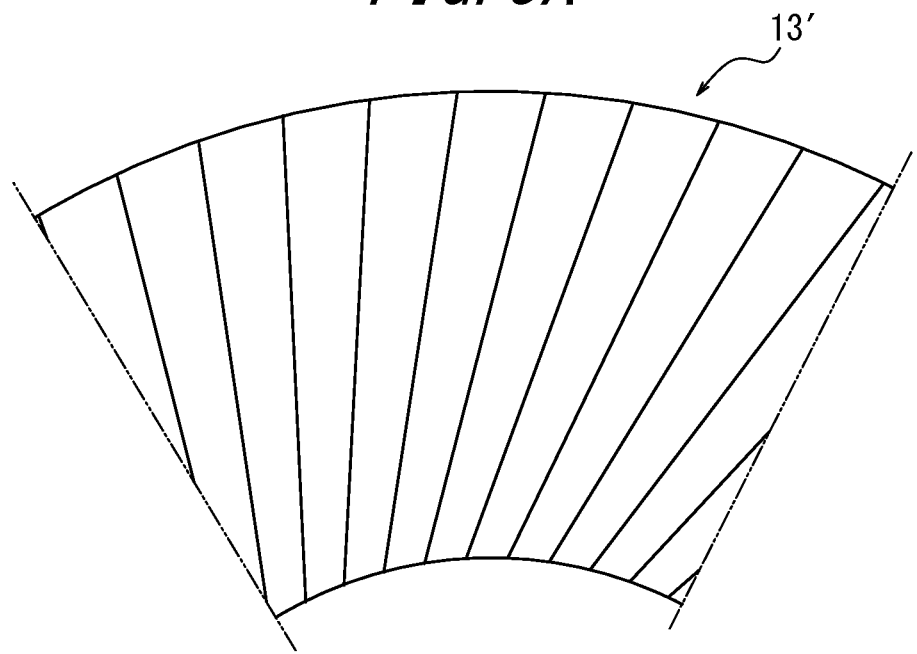
FIGS. 5A and 5B are views each illustrating in part the ridge molding part of a modified example of the tire mold according to the present invention.
Figure 5B:
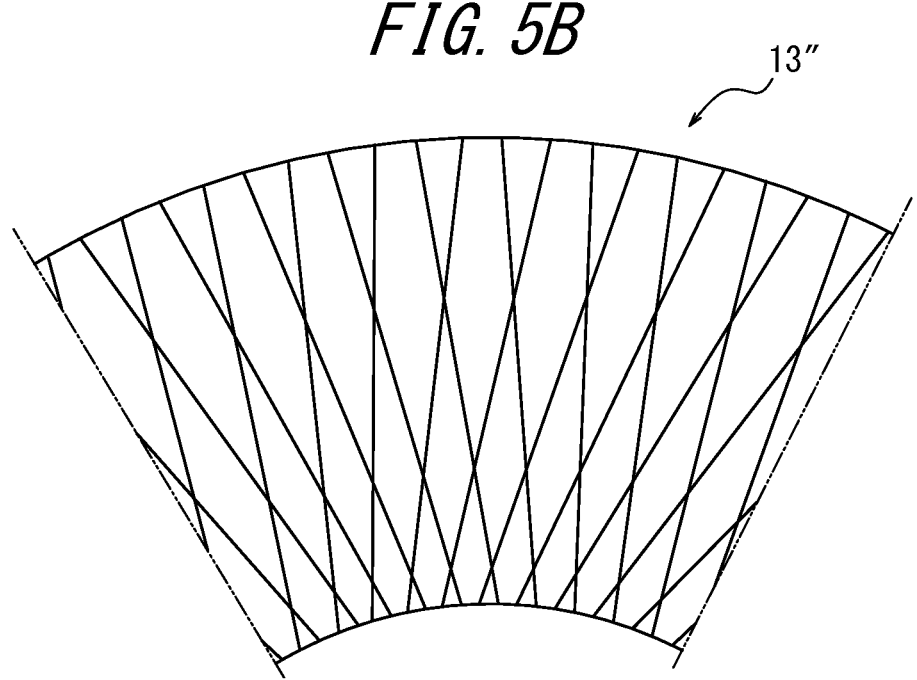

The tire mold and the pneumatic tire of the present invention have been described in the above with reference to the accompanying drawings. However, the tire mold and the pneumatic tire of the present invention are not limited merely to the aforementioned example, and the tire mold and the pneumatic tire of the present invention may be subjected to modification as appropriate. Specifically, the ridge molding part 13, which was formed by using the recessed grooves 12 extending in the mold radial direction in the aforementioned exemplary tire mold, may also be formed as appropriate, according to the tire mold of the present invention, as ridge molding parts 13', 13", for example, using radially-extending recessed grooves as illustrated in FIGS. 5A and 5B.

EXAMPLES

In the following, the present invention will further be described in detail with reference to Examples. However, the present invention is no way limited to Examples illustrated in below.

Examples 1 to 13

A tire mold was prepared to have the configuration illustrated in FIGS. 1, 2, with a ridge molding part having the specifications shown in Table 1.

Next, the tire mold thus prepared was used to manufacture fifty pneumatic tires configured as illustrated in FIGS. 3, 4 according to a conventional method.

Then, the number of tires with bare defects occurring in the bead portion was counted. Then, the number of tires that had experienced air leakage when assembled to an applicable rim and filled with an internal pressure (210 kPa) was counted. The results are shown in Table 1.

Examples 14 to 15

A tire mold was prepared, similarly to Example 3, except in that the ridge molding part was changed in shape to those illustrated in FIGS. 5A and 5B.

Next, the tire mold thus prepared was used to manufacture fifty pneumatic tires according to a conventional method.

Then, the number of tires with bare defects occurring in the bead portion was counted. Then, the number of tires that had experienced air leakage when assembled to an applicable rim and filled with an internal pressure (210 kPa) was counted. The results are shown in Table 1.

Conventional Example 1

A tire mold was prepared, similarly to Example 1, except in that the ridge molding part was not formed.

Then, the tire mold thus prepared was used to manufacture fifty pneumatic tires according to a conventional method.

Then, the number of tires with bare defects occurring in the bead portion was counted. Then, the number of tires that had experienced air leakage when assembled to an applicable rim and filled with an internal pressure (210 kPa) was counted. The results are shown in Table 1.

TABLE 1

| | Ridge Molding Part | | | | | |
| | | Recessed Groove | | | Bare Defects | Air Leakage |
| | Shape | Depth D [mm] | Arrangement Pitch P [mm] | Length L [mm] | [the tire count] | [the tire count] |
| --- | --- | --- | --- | --- | --- | --- |
| Conventional Example 1 | — | — | — | — | 8 | 0 |
| Example 1 | FIGS. 1, 2 | 0.1 | 0.6 | 4.0 | 3 | 0 |
| Example 2 | FIGS. 1, 2 | 0.2 | 0.6 | 4.0 | 0 | 0 |
| Example 3 | FIGS. 1, 2 | 0.3 | 0.6 | 4.0 | 0 | 0 |
| Example 4 | FIGS. 1, 2 | 0.4 | 0.6 | 4.0 | 0 | 0 |
| Example 5 | FIGS. 1, 2 | 0.5 | 0.6 | 4.0 | 0 | 3 |
| Example 6 | FIGS. 1, 2 | 0.3 | 0.4 | 4.0 | 2 | 0 |
| Example 7 | FIGS. 1, 2 | 0.3 | 0.8 | 4.0 | 0 | 0 |
| Example 8 | FIGS. 1, 2 | 0.3 | 1.0 | 4.0 | 0 | 0 |
| Example 9 | FIGS. 1, 2 | 0.3 | 1.2 | 4.0 | 0 | 3 |
| Example 10 | FIGS. 1, 2 | 0.3 | 0.6 | 1.0 | 5 | 0 |
| Example 11 | FIGS. 1, 2 | 0.3 | 0.6 | 2.0 | 0 | 0 |
| Example 12 | FIGS. 1, 2 | 0.3 | 0.6 | 10.0 | 0 | 0 |
| Example 13 | FIGS. 1, 2 | 0.3 | 0.6 | 15.0 | 0 | 10 |
| Example 14 | FIG. 5A | 0.3 | 0.6 | 4.0 | 0 | 0 |
| Example 15 | FIG. 5B | 0.3 | 0.6 | 4.0 | 0 | 0 |

It can be appreciated from Table 1 that the tires of Examples 1 to 15 had fewer occurrences of bare defects, as compared to the tire of Conventional Example 1. Further, in general, when vent holes or the like are formed in the flange contact portion molding region of a tire mold for the purpose of suppressing the occurrence of bare defects, a tire molded by using such tire mold would suffer a number of occurrences of air leakage resulting from the formation of spews. However, it can be identified that the occurrence of air leakage can possibly be suppressed in the tires of Examples 1 to 15.

INDUSTRIAL APPLICABILITY

According to the present invention, even in manufacturing a pneumatic tire with a downsized bead filler, it is possible to provide a tire mold capable of suppressing the occurrence of bare defect in the bead portion and also of manufacturing a pneumatic tire having excellent adhesion to the rim. Further, the present invention is capable of providing a pneumatic tire with a downsized bead filler having fewer occurrences of bare defects in the bead portion while having excellent adhesion to the rim.

REFERENCE SIGNS LIST 10 bead molding part
11 bead portion molding surface
12 recessed groove
12A, 12B apex
13, 13', 13" ridge molding part
14 recessed portion
15 flange contact portion molding region
16 bead base molding region
20 bead portion
21 outer surface
22 ridge
22A, 22B apex
23 ridge forming portion
24 projected portion
25 rim-flange contact portion
26 bead base
30 bead core
40 bead filler
41 tire radial direction outer end
50 radial carcass
BT bead toe
BH bead heel
R applicable rim
RL tire width direction line passing through the rim line position to extend along the tire width direction
S separating point

The invention claimed is:
1. A pneumatic tire, comprising:
a bead core embedded in a bead portion; and
a bead filler disposed on a tire radial direction outside of the bead core, wherein:
the bead filler has a tire radial direction outer end positioned more inward in a tire radial direction relative to a tire width direction line that passes through a rim line position to extend along the tire width direction, when viewed in section in the tire width direction of the tire which has been assembled to an applicable rim and filled with a predetermined internal pressure with no load applied thereon;
the bead portion has a ridge forming portion formed on an outer surface thereof, the ridge forming portion including a ridge extending in the tire radial direction;
the ridge forming portion is positioned in a rim-flange contact portion lying between a bead heel and the rim line position,
wherein the ridge of the ridge forming portion has a tire radial direction outer edge positioned outside in the tire radial direction than the tire radial direction outer end of the bead filler,
wherein the ridge of the ridge forming portion has a tire radial direction inner edge positioned inside in the tire radial direction than the tire radial direction outer end of the bead filler,
wherein the tire radial direction outer edge of the ridge lies at the same position as a tire radial direction outer edge of the rim-flange contact portion which is on the tire width direction line that passes through the rim line position.

2. The pneumatic tire according to claim 1, wherein the ridge has an extending-direction length of 2.0 mm or more and 10.0 mm or less.

3. The pneumatic tire according to claim 1, wherein the ridge has a height of 0.2 mm or more and 0.4 mm or less.

4. The pneumatic tire according to claim 1, wherein:
the ridge forming portion includes a plurality of ridges; and
the ridges have an arrangement pitch between 0.6 mm and 1.0 mm.

5. The pneumatic tire according to claim 1, wherein the ridge forming portion is in a knurled shape.

6. The pneumatic tire according to claim 1, the ridge forming portion extends to an intersection between the tire outer surface and a normal line passing through the tire radial direction outer end of the bead filler to intersect at a right angle with the tire outer surface.

7. The pneumatic tire according to claim 1, wherein the ridge forming portion has a tire radial direction outer edge which lies at the same position as a tire width direction inner edge of a projected portion which coincides with the rim line position and formed on the tire outer surface.

8. A pneumatic tire, comprising:
a bead core embedded in a bead portion; and
a bead filler disposed on a tire radial direction outside of the bead core, wherein:
the bead filler has a tire radial direction outer end positioned more inward in a tire radial direction relative to a tire width direction line that passes through a rim line position to extend along the tire width direction, when viewed in section in the tire width direction of the tire which has been assembled to an applicable rim and filled with a predetermined internal pressure with no load applied thereon;
the bead portion has a ridge forming portion formed on an outer surface thereof, the ridge forming portion including a ridge extending in the tire radial direction;
the ridge forming portion is positioned in a rim-flange contact portion lying between a bead heel and the rim line position,
wherein the ridge of the ridge forming portion has a tire radial direction outer edge positioned outside in the tire radial direction than the tire radial direction outer end of the bead filler,
wherein the ridge of the ridge forming portion has a tire radial direction inner edge positioned inside in the tire radial direction than the tire radial direction outer end of the bead filler,
wherein the tire radial direction outer edge of the ridge lies at the same position as a tire width direction inner edge of a projected portion which coincides with the rim line position and formed on the tire outer surface.

9. The pneumatic tire according to claim 8, wherein the ridge has an extending-direction length of 2.0 mm or more and 10.0 mm or less.

10. The pneumatic tire according to claim 8, wherein the ridge has a height of 0.2 mm or more and 0.4 mm or less.

11. The pneumatic tire according to claim 8, wherein:
   the ridge forming portion includes a plurality of ridges; and
   the ridges have an arrangement pitch between 0.6 mm and 1.0 mm.

12. The pneumatic tire according to claim 8, wherein the ridge forming portion is in a knurled shape.

13. The pneumatic tire according to claim 8, wherein the ridge forming portion extends to an intersection between the tire outer surface and a normal line passing through the tire radial direction outer end of the bead filler to intersect at a right angle with the tire outer surface.

* * * * *